US012601328B2

(12) United States Patent
Li

(10) Patent No.: US 12,601,328 B2
(45) Date of Patent: Apr. 14, 2026

(54) HEAT PUMP ENGINE

(71) Applicant: Qiang Li, Hefei (CN)

(72) Inventor: Qiang Li, Hefei (CN)

( * ) Notice: Subject to any disclaimer, the term of this patent is extended or adjusted under 35 U.S.C. 154(b) by 0 days.

(21) Appl. No.: 19/019,254

(22) Filed: Jan. 13, 2025

(65) Prior Publication Data

US 2026/0063113 A1      Mar. 5, 2026

(30) Foreign Application Priority Data

Sep. 4, 2024    (CN) ........................ 202411234712.X

(51) Int. Cl.
*F03G 7/04* (2006.01)
(52) U.S. Cl.
CPC ............. *F03G 7/047* (2021.08); *Y02T 50/678* (2013.01)
(58) Field of Classification Search
CPC ............................... F03G 7/047; Y02T 50/678
See application file for complete search history.

(56) References Cited

U.S. PATENT DOCUMENTS

| | | | |
|---|---|---|---|
| 9,038,390 B1 * | 5/2015 | Kreuger | F03G 6/092 |
| | | | 60/670 |
| 12,241,421 B1 * | 3/2025 | Minelli | F02C 7/36 |
| 2008/0141921 A1 * | 6/2008 | Hinderks | F01L 3/22 |
| | | | 114/274 |
| 2017/0234315 A1 * | 8/2017 | Hammoud | F02C 3/10 |
| | | | 60/801 |

FOREIGN PATENT DOCUMENTS

JP            2015028333 A  *  2/2015

* cited by examiner

*Primary Examiner* — Hoang M Nguyen

(57)            ABSTRACT

The invention discloses a heat pump engine, which can turn the internal energy of the atmosphere and seawater drawn by the low-boiling refrigerant into kinetic energy to drive the propeller and generator, and become a brand-new power generation equipment and ship propelling power without consuming any fuel and working stably for a long period of time; and it can completely solve a series of problems such as crustal damage, environmental pollution, high power generation cost, and conflict of interest caused by uneven distribution of the world, as well as photovoltaic power, wind power, and hydroelectric power, etc., which are brought about by fossil energy, and the serious constraints on the location of weather and environment, as well as serious constraints of weather environment location, and unstable power supply.

2 Claims, 2 Drawing Sheets

HEAT PUMP ENGINE

1. TECHNICAL FIELD

The invention relates to the technical field of heat pump engines, in particular to a heat pump engine.

2. BACKGROUND ART

The energy necessary for the survival and development of human beings is usually manifested as thermal, mechanical and electromagnetic energy, which can be transformed into each other, with electric energy being the most widely used. The energy can be obtained through in addition to light energy from the sun and transformed wind energy, mechanical energy of water, chemical energy of plants, etc., which can be turned into electricity through solar panels, fans, and turbines driving generators, it can also be obtained through the fossil energy from the earth's crust, gasoline, kerosene, diesel oil, heavy oil and petroleum gas, etc., which are refined from petroleum, as shown in FIG. 3, chemical energy can be converted into thermal energy and then into mechanical energy or further into electric energy through gasoline engines, gas turbines, diesel engines and boilers plus steam turbines, etc.; coal and nuclear fuels provide thermal energy for thermal power plants and nuclear power plants and then into electric energy. Each of these energy acquisitions has its own advantages, but more often than not, each has its own difficulties and drawbacks, such as the need for more equipment, the capacity of the process is complex, low conversion efficiency, environmental pollution, climate warming, especially the cost is too high.

The invention provides a single heat source heat engine in the thermodynamic sense-heat pump engine, which can convert atmospheric and seawater internal energy into kinetic energy to drive propellers and generators, and can end the history of fossil energy.

3. SUMMARY OF THE INVENTION

It is an object of the invention to provide a heat pump engine to solve the above problems raised in the background art.

In order to solve the above technical problems, the invention provides the following technical solution:

The invention provides a heat pump engine, a multi-stage impeller type compressor is surrounded by a multi-stage impeller type turbine, a straight-grained tapered cylindrical shell of the compressor is also a turbine rotor and a power output cylinder shaft; an outlet of the turbine is folded back to a center, which is an inlet of the compressor, conducive to the recovery of the released heat by compression, and also conducive to the overall compact structure and rational layout; including:

a spindle, which is connected with an interior of a slender neck of the straight-grained tapered cylinder and an external spline, the spindle is connected with a spindle front bearing in a threaded manner; a second high-pressure dynamic sealing ring is arranged behind the spindle front bearing 27 to seal high-pressure liquid flow of a liquid collecting ring chamber;

a nose cone fairing, the nose cone fairing and an inlet grille and an outer ring are a fixed whole to cover front ends of two semi-circular cylindrical protection covers and be fixed with screws, and the protection covers are fixed via edgings with screws;

a front propeller and a rear propeller, propeller blades and a propeller hub are an integral whole, and are connected with head and tail screws of the spindle;

front generators and a gas collecting chamber-they are separated by a front compartment base.

front supports fixedly connected between the protective cover and a main body is fused with an outer side of a front end of a front section of a main body shell, and an axial visual angle of all supports are radially arranged and are consistent with the directions and the quantity of the evaporating pipes radially extending out of an outer wall of the gas collecting chamber; a periphery of each support is fused with a wheel rim which can be attached to the corresponding part of the protective cover and is fixedly connected to an inner side of the protective cover by screws; front and rear edges of each support are in a cutting edge shape, with a middle part being thick, and the rear edge is fixed with a rib which is arranged in front of the evaporating pipes by screws and nuts;

each evaporating pipe is longitudinally arranged and radially arranged, with tail ends of all evaporating pipes are respectively loose before assembly, and front ends of the evaporating pipes are all centripetally bent and are integrated with an approximate circular truncated cone-shaped annular cylinder tightly attached to an outer wall of a front section of the main body shell, and the evaporating pipes are fixedly connected to the outer wall of the front section of the main body shell via screws; a tail end of each evaporating pipe is fastened by a nut on a tailstock through external threads; the main body shell surrounded by each evaporating pipe is divided into two sections; an inner side of a front end of a front section is fixedly connected with the front compartment base via screws; a rear end and a front end of the rear end is fixedly connected to an exterior of a hollow shell of a gas compressor stator via screws; an inner side of a rear end of a rear section is fixedly connected with a rear compartment base via screws;

liquid flow core pipes, the liquid flow core pipes at an axle centre of each evaporating pipe extends out of a front end of each evaporating pipe, penetrates through the gas collecting chamber and is screwed into corresponding liquid flow hole on an inner wall of the gas collecting chamber through a through screw; the liquid flow holes are communicated with the liquid collecting ring chamber at an outlet of the small turbine, and each liquid flow core pipe is fixedly connected with a proper amount of radial tripod supports, so that the liquid flow core pipe is always centered in the evaporating pipe; a tail end of each liquid flow core pipe is arranged in a rear support and is fastened on a check valve by a through screw against a flange of a pipe end;

front and rear edges of each support are in a cutting edge shape, with a middle part being thick, openings are provided on middle and rear parts of all rear supports on a same side, and are provided with covers, and are fixedly connected by through screws; because in each hollow support is provided with a row of tailstocks and check valves for each evaporating pipe, easy to assemble and maintenance;

a heat exchange chamber radiator, a base of which is fixedly connected to an outside of the neck of the straight-grained tapered cylinder in a spline manner, and is pressed against by a small turbine stator, which is also fixedly connected to an outside the slender neck of the straight-grained tapered cylinder in a spline manner;

inlet and outlet ends of a heat exchange chamber on the base are both provided with a bracket respectively for supporting and fixedly connecting the radiator and are integrated with the base;

the radiator is screwed into a hole communicated with a compressor outlet in the base by a through screw against the flange of the pipe end at the outlet end of the heat exchange chamber; and the radiator is screwed into a hole communicated with an inlet of the small turbine in the base in the same way at the inlet end of the heat exchange chamber;

a gas compressor rotor, a rear end of a hub of the gas compressor rotor is constrained on a radiator base by a high-pressure dynamic sealing ring with a sliding bearing; a front end is restrained in an inner wall of the gas collecting chamber by a third high-pressure dynamic sealing ring with a sliding bearing;

an exhaust nozzle exit with a jet flow drainage groove, an outlet grille and a stern cone fairing are integrated, and a front end covers rear ends of two semi-circular cylindrical protection covers and is fastened by screws;

a compressor inner rotor, a front end of a cylinder shaft of the compressor inner rotor is slidably connected with an inner side of a throat part of the straight-grained tapered cylinder by a first high-pressure dynamic sealing ring; a rear end is connected with the spindle through a tapered roller bearing, an outside of an end is fixedly connected with a sun gear of a planetary gear, and an inside of an end supports a large-opening-end bearing of the straight-grained tapered cylinder;

a gear ring of the planetary gear, the gear ring is fixedly connected to a rear section of the spindle in a spline mode through a wheel disc hub; a front end of a rear end first integrated starter and generator is fixedly connected to the gear ring through internal threads; a shaft end bearing of spindle outer sleeve is sleeved on the spindle and is propped against the spindle in front of the gear ring of the planetary gear;

a centripetal inner-rolling backflow chamber is partitioned, after a front compartment base is fixedly connected with a front end of a front section of the main body shell, a spindle front bearing is installed, a front generator is installed, then a front end cover is installed, and is fixedly connected to the front compartment base through screws; a propeller shaft sealing ring is arranged on the front end cover, and a sealing ring cover is fixedly connected to the front end cover through screws; the front propeller is fastened at a front end of the spindle by a washer nut;

a rear compartment base is used for partitioning the centripetal inner-rolling backflow chamber and rear end integrated starter and generator chamber; after the rear compartment base is fixedly connected with a rear end of a rear section of the main body shell, it's installed with planetary gears, the planetary gear is fixedly connected to the rear compartment base through screws, the gear ring hub is fixedly connected to the spindle in a spline mode, installing the rear end integrated starter and generator, a base of the integrated starter and generator is fixedly connected to the rear compartment base through screws, a base of a stator is also a spindle rear bearing, and an inner ring of the bearing is restrained on the spindle through a backstop backing ring; the backstop backing ring fixedly connected to the spindle through threads restrains both the bearing and the gear ring hub; a rear end cover with a propeller shaft sealing ring is fixedly connected to the rear compartment base through screws, and the sealing ring cover is fixedly connected to the rear end cover through screws; the rear propeller is fastened at a rear end of the spindle through a washer nut;

sealing rings are provided between a shaft end of spindle outer sleeve and the rear compartment base to block the centripetal inner-rolling backflow chamber, a planetary gear chamber and integrated starter and generator chambers;

the rear support and a periphery of the rear compartment base are fused together and radially and uniformly distributed, and are consistent with the longitudinally and radially arranged evaporating pipes; the periphery is also fused with a wheel rim which can be attached to the corresponding part of the protective cover and is also fixedly connected to the inner side of the protective cover by screws;

blades of all impellers are integrally processed with the hub or the wheel rim, and an interior of the hub or an exterior of the wheel rim are fixedly connected with corresponding parts in a spline mode.

As an improvement, a power machine comprises a plurality of temperature, pressure and rotating speed sensors and an self-destruction electronic control system for preventing private disassembly and displacement, and self-destruction charge is arranged in the front compartment base, a hollow shell of the compressor stator and the rear compartment base.

The invention adopts the following key measures:

First, the multi-stage impeller type compressor is surrounded by multi-stage impeller type turbine, the straight-grained tapered cylindrical shell of the compressor is also turbine rotor and a power output cylinder shaft, conducive to the recovery of the released heat by compression. Second, a multi-stage impeller type gas compressor is provided between the gas collecting chamber for collecting gases from all evaporating pipes and the turbine, which blocks and recovers the jacking of gaseous refrigerant in front of an outlet of the turbine with temperature and pressure boosted after pressure condensation and heat release, and let the evaporating pipes out of the check valve in a low-temperature, easy to evaporate and fast heat-absorbing state. Third, a heat exchange chamber is provided between the gas compressor and turbine, and a high pressure and high temperature refrigerant at an outlet of the throat and neck part of the straight-grained tapered cylinder of the compressor is condensed back to the liquid state after the latent heat is released by the radiator heat exchange chamber.

Fourth, the straight-grained tapered cylinder is not only a power output rotating shaft, but also the a multi-stage impeller shell rotor embedded in the compressor, a cylindrical shaft rotor is sleeved outside the spindle, and multi-stage impellers fixedly connected to the cylindrical shaft rotor and multi-stage impellers on a shell rotor are alternately arranged and contra-rotated, so that the compression efficiency is greatly improved.

Fifth, a small turbine which is impacted by high-pressure liquid flow at an outlet of the radiator is arranged between the gas compressor hub and the slender neck of the straight-grained tapered cylinder, the stator is fixedly connected outside the slender neck, the rotor is fixedly connected in the gas compressor hub, and the small turbine not only recovers part of pressure energy of the high-pressure refrigerant which is pressed back to liquid state, but also enables the gas compressor to be faster and more efficient on the basis of the rotating speed of the turbine.

The heat pump engine, unlike the existing internal combustion engine, external combustion engine, turbine and other power machinery, does not consume any fuel, which only needs the water of rivers, lakes and oceans or the atmosphere with relatively not very low temperature as a heat source, and can convert most of the internal energy drawn from the water of rivers, lakes and oceans or the atmosphere by the low-boiling refrigerant into the mechanical energy to drive the propeller and the generator, and there is no residual heat discharged to the low-temperature heat source, thus becoming a new generator set or boat propulsion power machine.

Electric motors provide mechanical energy in a cleaner and more convenient way than internal combustion engines. Compared to photovoltaic power generation, wind and hydroelectric power generation, the present invention is much less affected by climate, environment and geographic settlement, the power supply is much more stable, and it is highly efficient and low cost. Compared with coal-fired boilers, oil (gas) boilers, nuclear reactor boilers and steam turbine generator sets, the present invention has a compact structure, covers a small area, is easy to install, does not consume any fuel, and provides inexpensive, abundant, and simple electricity. Compared with the ship nuclear power, the power unit structure of the invention is compact and lightweight, and does not occupy the compartment space, and there is no need to worry about nuclear radiation pollution, with low operating costs. Compared with the diesel engine, gas turbine power of surface ships, the invention has a compact and lightweight structure, can be lifted under the waterline of stern, which not only does not take up space in the compartment, but also do not need to carry fuel, greatly reducing the power cost, with range comparable to nuclear power. Compared with the diesel-electric power of submarines, the power advantages and disadvantages of this invention are even more different. As power for helium boats in airspace where atmospheric temperatures are not too low. Compared to photovoltaic power, batteries, motor power and gasoline engine power, this invention is more stable, long-lasting, and has a range comparable to nuclear power if always flown in low-altitude airspace at low to mid-latitudes, and is cheap and much safer.

4. BRIEF DESCRIPTION OF ACCOMPANY DRAWINGS

In order to illustrate the preferred embodiment of the invention or the technical scheme more clearly, the technical scheme of the preferred embodiment or the figures required by the embodiment or prior art is further described briefly. Obviously, only partial embodiments of the invention are shown and the actual structure is not limited thereto.

1 nose cone fairing, 2 front propeller, 3 first front generator, 4 front compartment base, 5 front support, 6 evaporating pipe, 7 liquid flow core pipe, 8 gas compressor rotor, 9 gas compressor stator, 10 first high-pressure dynamic sealing ring, 11 hollow shell of the compressor stator, 12 radiator, 13 turbine stator, 14 turbine rotor, 15 large-opening-end bearing of the straight-grained tapered cylinder, 16 shaft end bearing of spindle outer sleeve, 17 rear compartment base, 18 planetary gear carrier, 19 spindle rear bearing, 20 edging, 21 rear propeller, 22 propeller shaft sealing ring, 23 exhaust nozzle exit, 24 inlet grille, 25 propeller shaft sealing ring, 26 second front generator, 27 spindle front bearing, 28 second high-pressure dynamic sealing ring, 29 liquid collecting ring chamber, 30 gas collecting chamber, 31 third high-pressure dynamic sealing ring, 32 small turbine, 33 fourth high-pressure dynamic sealing ring, 34 compressor outlet, 35 spindle, 36 compressor outer rotor, 37 compressor inner rotor, 38 centripetal inner-rolling backflow chamber, 39 sealing ring, 40 sun gear, 41 gear ring, 42 first integrated starter and generator, 43 second integrated starter and generator, 44 rear support, 45 outlet grille, 46 stern cone fairing.

Figure 1:
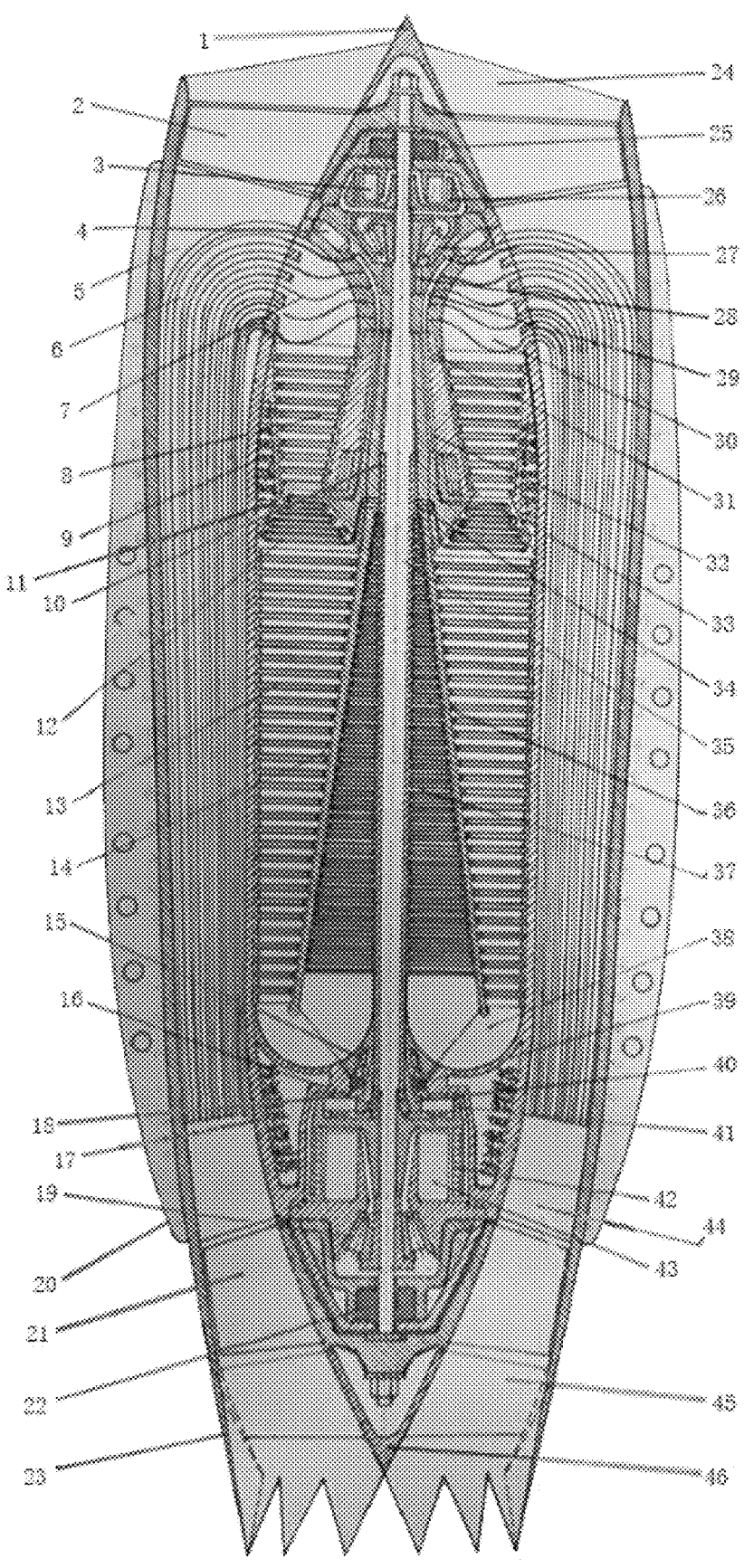
FIG. 1 is a structural diagram of a heat pump engine provided by the invention.
Figures 2, 3:
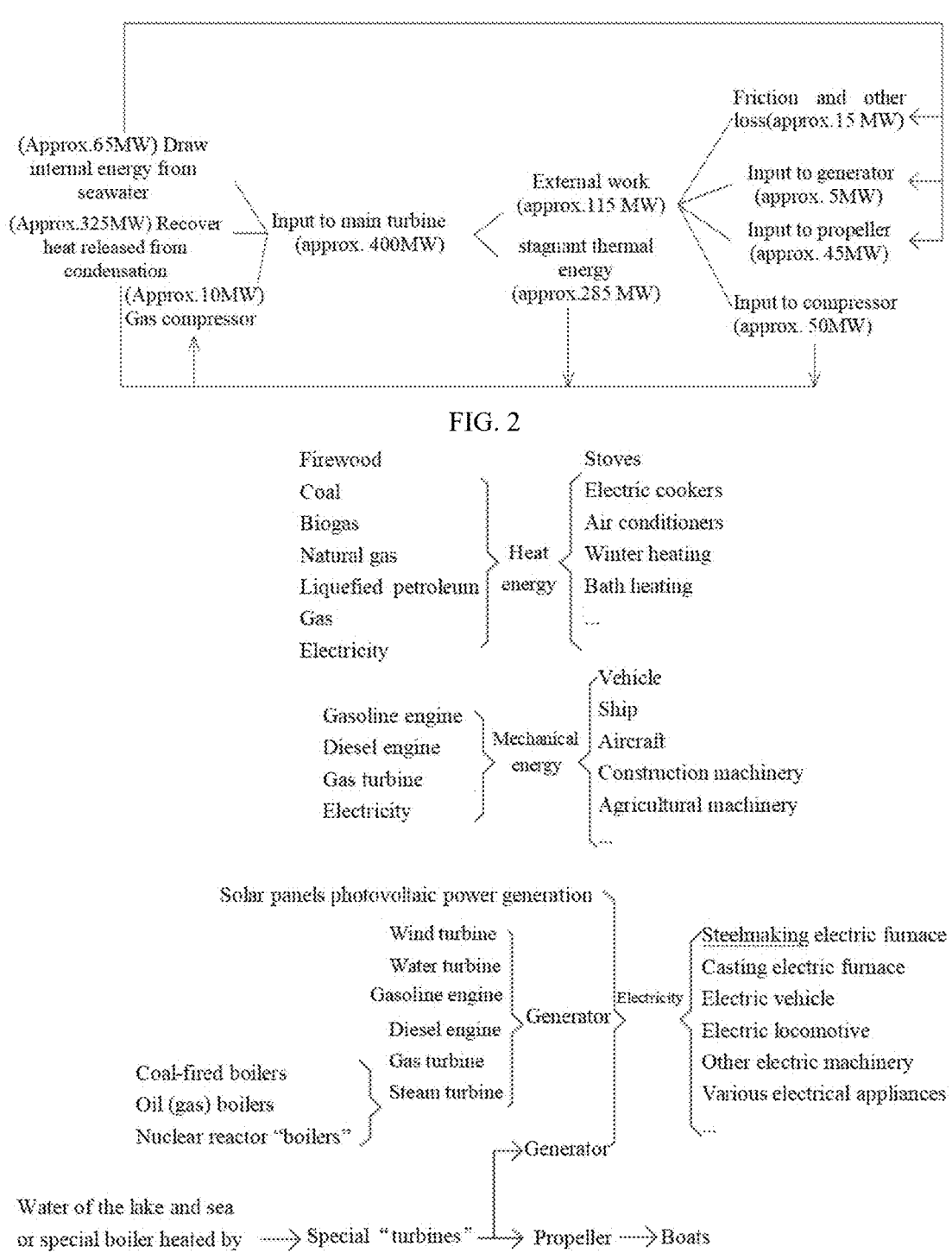
FIG. 2 is an embodiment diagram of a heat pump engine provided by the invention.
FIG. 3 is a background art diagram of a heat pump engine provided by the invention.

For clarity, the main body and its shell shown in FIGS. 1-3 are identified as element 100. The radial tripod supports are identified as element 101. These elements are already shown in the drawings, and the addition of reference numerals in the specification does not require any drawing amendments.

For clarity, the main body and its shell shown in FIGS. 1-3 are identified as element 100. The radial tripod supports are identified as element 101. These elements are already shown in the drawings, and the addition of reference numerals in the specification does not require any drawing amendments.

5. SPECIFIC EMBODIMENT OF THE INVENTION

The heat pump engine is further described in detail hereinafter with reference to the FIG. 1 and FIG. 2.

The embodiment provides a heat pump engine, including a spindle 35, which is connected with an interior of a slender neck of the straight-grained tapered cylinder and an external spline, the spindle 35 is connected with a spindle front bearing 27 in a threaded manner; a second high-pressure dynamic sealing ring 28 is arranged behind the spindle front bearing 27 to seal high-pressure liquid flow of a liquid collecting ring chamber 29;

The spindle 35 is a stepped shaft with a middle front section (a fixed joint of an external spline and an internal spline of a slender neck of the straight-grained tapered cylinder) tapered towards a front end and a rear end;

a nose cone fairing 1, the nose cone fairing 1 and an inlet grille 24 and an outer ring are a fixed whole to cover front ends of two semi-circular cylindrical protection covers and be fixed with screws, and the protection covers are fixed via edgings 20 with screws;

a front propeller 2 and a rear propeller 21, propeller blades and a propeller hub are an integral whole, and are connected with head and tail screws of the spindle 35;

a first front generator 3, a second front generator 26, and a gas collecting chamber 30 are separated by a front compartment base.

front supports 5 fixedly connected between the protective cover and a main body is fused with an outer side of a front end of a front section of a main body shell, and an axial visual angle of all supports are radially arranged and are consistent with the directions and the quantity of the evaporating pipes 6 radially extending out of an outer wall of the gas collecting chamber 30; a periphery of each support is fused with a wheel rim which can be attached to the corresponding part of the protective cover and is fixedly connected to an inner side of the protective cover by screws; front and rear edges of each support are in a cutting edge shape, with a middle part being thick, and the rear edge is fixed with a rib which is arranged in front of the evaporating pipes 6 by screws and nuts;

each evaporating pipe 6 is longitudinally arranged and radially arranged, with tail ends of all evaporating pipes 6 are respectively loose before assembly, and front ends of the evaporating pipes 6 are all centripetally bent and are integrated with an approximate circular truncated cone-shaped annular cylinder tightly attached to an outer wall of a front section of the main body shell, and the evaporating pipes 6 are fixedly connected to the outer wall of the front section of the main body shell via screws; a tail end of each evaporating pipe 6 is fastened by a nut on a tailstock through external threads; the main body shell surrounded by each evaporating pipe 6 is divided into two sections; an inner side of a front end of a front section is fixedly connected with the front compartment base via screws; a rear end and a front end of the rear end is fixedly connected to an exterior of a hollow shell of a gas compressor stator 9 via screws; an inner side of a rear end of a rear section is fixedly connected with a rear compartment base via screws;

liquid flow core pipes 7, the liquid flow core pipes 7 at an axle centre of each evaporating pipe 6 extends out of a front end of each evaporating pipe, penetrates through the gas collecting chamber 30 and is screwed into corresponding liquid flow hole on an inner wall of the gas collecting chamber 30 through a through screw; the liquid flow holes are communicated with the liquid collecting ring chamber 29 at an outlet of the small turbine 32, and each liquid flow core pipe 7 is fixedly connected with a proper amount of radial tripod supports, so that the liquid flow core pipe 7 is always centered in the evaporating pipe 6; a tail end of each liquid flow core pipe 7 is arranged in a rear support and is fastened on a check valve by a through screw against a flange of a pipe end;

front and rear edges of each support are in a cutting edge shape, with a middle part being thick, openings are provided on middle and rear parts of all rear supports on a same side, and are provided with covers, and are fixedly connected by through screws; because in each hollow support is provided with a row of tailstocks and check valves for each evaporating pipe 6, easy to assemble and maintenance;

a heat exchange chamber radiator 12, a base of which is fixedly connected to an outside of the neck of the straight-grained tapered cylinder in a spline manner, and is pressed against by a small turbine 32 stator, which is also fixedly connected to an outside the slender neck of the straight-grained tapered cylinder in a spline manner;

inlet and outlet ends of a heat exchange chamber on the base are both provided with a bracket respectively for supporting and fixedly connecting the radiator 12 and are integrated with the base;

the radiator 12 is screwed into a hole communicated with a compressor outlet 34 in the base by a through screw against the flange of the pipe end at the outlet end of the heat exchange chamber; and the radiator is screwed into a hole communicated with an inlet of the small turbine 32 in the base in the same way at the inlet end of the heat exchange chamber;

a gas compressor rotor 8, a rear end of a hub of the gas compressor rotor 8 is constrained on a radiator 12 base by a fourth high-pressure dynamic sealing ring 33 with a sliding bearing; a front end is restrained in an inner wall of the gas collecting chamber 30 by a third high-pressure dynamic sealing ring 31 with a sliding bearing;

an exhaust nozzle exit 23 with a jet flow drainage groove, an outlet grille 45 and a stern cone fairing 46 are integrated, and a front end covers rear ends of two semi-circular cylindrical protection covers and is fastened by screws;

a front end of a cylinder shaft of the compressor inner rotor 37 is slidably connected with an inner side of a throat part of the straight-grained tapered cylinder by a first high-pressure dynamic sealing ring 10; a rear end is connected with the spindle 35 through a tapered roller bearing, an outside of an end is fixedly connected with a sun gear 40 of a planetary gear, and an inside of an end supports a large-opening-end bearing of the straight-grained tapered cylinder 15;

a gear ring 41 of the planetary gear, the gear ring is fixedly connected to a rear section of the spindle 35 in a spline mode through a wheel disc hub; a front end of a rear end first integrated starter and generator 42 is fixedly connected to the gear ring 41 through internal threads; a shaft end bearing of spindle outer sleeve is sleeved on the spindle and is propped against the spindle in front of the gear ring 41 of the planetary gear;

a rear compartment base is provided between the centripetal inner-rolling backflow chamber 38 and integrated starter and generators 42 and 43; after a front compartment base is fixedly connected with a front end of a front section of the main body shell, a spindle front bearing 27 is installed, a first front generator 3 and a second front generator 26 are installed, then a front end cover is installed, and is fixedly connected to the front compartment base through screws; a propeller shaft sealing ring 25 is arranged on the front end cover, and a sealing ring cover is fixedly connected to the front end cover through screws; the front propeller is fastened at a front end of the spindle by a washer nut;

after the rear compartment base is fixedly connected with a rear end of a rear section of the main body shell, it's installed with planetary gears 18 and 40, the planetary gear 18 is fixedly connected to the rear compartment base through screws, the gear ring hub is fixedly connected to the spindle 35 in a spline mode, installing the rear end first integrated starter and generator 42 and second integrated starter and generator 43, a base of the second integrated starter and generator 43 is fixedly connected to the rear compartment base through screws, a base of a stator 43 is also a spindle rear bearing 19, and an inner ring of the bearing 19 is restrained on the spindle 35 through a backstop backing ring; the backstop backing ring fixedly connected to the spindle through threads restrains both the bearing 19 and the gear ring 41 hub; a rear end cover with a propeller shaft sealing ring 22 is fixedly connected to the rear compartment base through screws, and the sealing ring cover is fixedly connected to the rear end cover through screws; the rear propeller 21 is fastened at a rear end of the spindle 35 through a washer nut;

sealing rings 39 are provided between a shaft end of spindle outer sleeve and the rear compartment base to block the centripetal inner-rolling backflow chamber

38, planetary gears 18 and 40 chamber and integrated starter and generators 42 and 43 chamber;

the rear support 44 and a periphery of the rear compartment base are fused together and radially and uniformly distributed, and are consistent with the longitudinally and radially arranged evaporating pipes 6; the periphery is also fused with a wheel rim which can be attached to the corresponding part of the protective cover and is also fixedly connected to the inner side of the protective cover by screws;

blades of all impellers are integrally processed with the hub or the wheel rim 9, 13, 14, 36, and 37, and an interior of the hub or an exterior of the wheel rim are fixedly connected with corresponding parts in a spline mode.

As an improvement, a power machine comprises a plurality of temperature, pressure and rotating speed sensors and an self-destruction electronic control system for preventing private disassembly and displacement, and self-destruction charge is arranged in the front compartment base 4, a hollow shell of the compressor stator and the rear compartment base 17. In the concrete implementation, the characteristics that the low-boiling-point refrigerant can absorb heat at low temperature and evaporate and expand to do work at low pressure and can radiate heat at high temperature and condensate at high pressure to absorb heat again and evaporate and expand to do work are utilized, the refrigerant is sealed in a closed circulating flow channel of "evaporator—evaporator—gas collecting chamber—gas compressor—heat exchange chamber-turbine—centripetal bending backflow chamber—compressor—radiator in the heat exchange chamber—high-pressure liquid flow turbine for driving the gas compressor—liquid collecting chamber communicated with a liquid storage tank—liquid flow core pipe in a center of each evaporating pipe—core pipe tail end check valve—evaporator", and the evaporator is immersed in water in rivers, lakes and seas or in the atmosphere with the temperature generally not lower than 0° C.

The compressor compresses gaseous refrigerant into liquid at normal temperature and low pressure, which is cooled through the radiator in a center of the heat exchange chamber and then impacts the small turbine driving the compressor to release part of pressure energy to enter the liquid collecting chamber, then flows into each liquid flow core pipe of the evaporator in four walls to the check valve, throttled and depressurized, and then enters the evaporating pipe, absorbing the heat energy of an external environment heat source led in by a pipe wall, vaporized, expanded and pressurized, entering the gas collecting chamber, then it's pressed into the heat exchange chamber by the gas compressor to absorb the heat released by the condensed refrigerant in the radiator, further heated, pressurized and expanded, then impacts a rotor wheel of the (main) turbine, and absorbing the heat released by the compressor led in through blades and the rotating shaft while striking, and further obtaining more rotational kinetic energy.

The turbine rotates to drive the compressor and the spindle to rotate, the spindle drives the propeller and the generator, and meanwhile, the planetary gear drives the alternately arranged compressors to rotate contrarily, impellers rotate in a doubled speed in a reverse direction so as to enhance the compression efficiency of the contrarotating impellers. Most of the mechanical energy consumed by the compressor is converted into pressure condensation heat to be recovered, and a small part of the mechanical energy impacts a small turbine of the compressor to drive the compressor to rotate at a high speed by the pressure energy, so that a low-pressure area is formed at an outlet of a main turbine, and the main turbine obtains larger rotation kinetic energy.

Take a 50 MW/unit ship power unit as an example: as shown in FIG. 2 attached.

In order to make the refrigerant can continue to absorb heat, evaporate, expand, recover, go through pressure condensation, heat release, and do work after further expansion and pressurization, and then compressed back to the liquid state to release heat and then flow back to the evaporator, circulating without stop, so as to output power continuously; the refrigerant should be sealed in the closed circulating flow channel, the machinery that does work must be a multi-stage impeller type turbine, the compressor and gas compressor must also be a multi-stage impeller type, and the compressor must be in the center of the turbine is completely surrounded, the straight-grained tapered cylinder acts as both a inner shell of the turbine and a cone-shaped rotating shaft, which is also a cone-shaped outer shell of the compressor, to facilitate the recovery of pressure condensation and heat release, which is a first key.

An outer shell of the turbine is a cylindrical cylinder, which is a middle section of a main shell, with front and end extending to a front and back approximate circular truncated cone-shaped annular cylinder, and forms a shuttle-shaped streamlined body along with the fairing with pointed cone-shaped front and back. All evaporating pipes of the evaporator which absorbs internal energy of the environment heat source are annularly distributed on a periphery of the main body of the evaporator and is surrounded by a protective cover with the shape similar to a waist drum, grilles are arranged at an inlet and an outlet; the environment heat source is absorbed by the front propeller from the inlet grille, flows through an outer surface of each evaporating pipe to absorb heat and reduce the temperature, which is extruded and accelerated by the gradually contracted flow channel, and is driven by the tail propeller to be sprayed out from the outlet grille.

An outer wall of the straight-line conical surface cylinder in the main body is fixedly connected with a multi-stage impeller of the turbine rotor and is alternately arranged with a stator guide impeller fixedly connected on an inner wall of the main body shell. An axis of the straight-grained tapered cylinder is provided with a spindle which penetrates through front and back, and the neck of the tapered cylinder is firmly sleeved and connected by a cylindrical cylinder at conic node.

An inner wall of the tapered cylinder is fixedly connected with a multi-stage impeller of the compressor and is alternatively configured with the multi-stage impeller of the counter-rotating compressor fixedly connected with an outer wall of a spindle outer sleeve shaft, inner and outer parts of a bell mouth of the tapered cylinder are respectively an inlet of the compressor and an outlet of the turbine; at the position turning from the outlet to the inlet is a 180 degree inward folding return chamber or inward-rolling backflow chamber where the gaseous refrigerant is flushed out by the turbine and sucked in by the compressor.

The straight-grained tapered cylinder has a gap between its top neck and spindle before it is held tightly by cylindrical cylinder, and a ring slot is used as compressor outlet, and a plurality of holes around the cylindrical cylinder are fixedly connected with all radiating tubes of the radially arranged radiators, an other end of all radiating tubes is opened at an inlet of the small turbine for driving the gas compressor.

A front and rear of the heat exchange chamber with the radiator is provided with the gas compressor and the turbine in its axial direction, the layout of which is the second key, which means that the gas compressor is necessary, and the heat exchange chamber is also necessary; the gas compressor can enable gaseous refrigerant which enters the heat exchange chamber and then impacts the turbine rotor and fully recovers heat generated by condensation to increase temperature and boost pressure, and it does not cause jacking to the upstream so that the refrigerant after the check valve can be more smoothly evaporated at low pressure. At the same time, the latent heat must be released in the radiator before the refrigerant flows back to the evaporator.

Multi-stage driving impellers of the compressor, namely rotors, are respectively sleeved in a liquid collecting chamber outer wall of the front compartment base and on the radiator base by high-pressure dynamic sealing rings with bearings at front and rear ends of the hub, and are driven by the small turbine impacted by high-pressure liquid flow from the radiator, and the corresponding alternately-arranged multi-stage guide impellers are fixedly connected into a hollow stator shell on the inner wall of the main body shell by a peripheral wheel rim. The gas compressor is accelerated to rotate by the small turbine driven by high-pressure liquid flow on the basis of the rotating speed of the main turbine, and its efficiency is greatly improved, and the liquid flow pressure can be partially recycled, which is the third key.

And then the gas collecting chamber in front of an inlet of the gas compressor, which collects the gas refrigerant which is sprayed from outlets of all evaporating pipes of the evaporators uniformly distributed on a peripheral annular wall and absorbs the heat of the environmental heat source. Meanwhile, the liquid flow core pipe at the center of each evaporating pipe penetrates through the annular gas collecting chamber to be communicated with the annular liquid collecting chamber at the outlet of the small turbine in its central inner wall.

In front of the main body, which is a front of the gas collecting chamber, is used for restraining the spindle and separating the gas collecting chamber and the front compartment base of the front generator chamber. The spindle penetrates through a sealing ring at the center of the spindle, is fixedly connected with a backstop pin ring, is restrained by a bearing and then enters the front generator chamber to be fixedly connected with the generator rotor. It continuously forwards passes through a central sealing chamber of a circular truncated cone-shaped main body shell to be fixedly connected with the front propeller. The propeller hub is a smaller circular truncated cone shape, and forms a front section of a pointed cone streamline body together with a pointed cone-shaped fairing at the center of the inlet grille.

A periphery of the main body shell at the front compartment base is fixedly connected with front supports which can support a front end of the evaporator and support a front part of the protective cover. A back wall of the inward-rolling backflow chamber along the spindle is the rear compartment base for separating the inward-rolling backflow chamber and a rear generator chamber. If the main function of the engine is boat propelling power, the periphery of the main body shell at the rear compartment base is also fixedly connected with the rear supports which supports tail ends of the evaporating pipes of the evaporator and supports a rear part of the protective cover. If the main function is only necessary for generating electricity, the rear support is the rear outlet grille, and the central pointed cone-shaped fairing is also a part of the main body shell, namely a fixedly connected tail cone. Meanwhile, a rear section of the protective cover does not need to be contracted to press the overflowing heat source to accelerate outflow to obtain reverse thrust.

The spindle and the sleeve shaft outside the spindle penetrate through the rear compartment base and are restrained by the bearing thereof, the sleeve shaft penetrates out of the spindle and is fixedly connected with the sun gear of the planetary gear of the planetary carrier, which is fixedly connected with the compartment base, the spindle penetrates out of the sun gear and is fixedly connected with the gear ring of the planetary gear, and the alternately arranged compressor impellers fixedly connected to an outer wall of the sleeve shaft and inner wall of the straight-grained tapered cylinder respectively rotate oppositely at high speed, so that the compression efficiency can be greatly improved. This is the fourth key.

In the rear generator chamber, the spindle is fixedly connected to an outside of the gear ring of the planetary gear, and then extends backward to be fixedly connected with the rotor of the integrated starter and generator. If the main function of this single-source heat engine is for propelling power, the spindle goes through the sealing chamber at a center of the circular truncated cone-shaped tail end of the main body shell and is fixedly connected to the rear propeller. A rear section of the main shell body together with the propeller hub and the fairing in the center of the outlet grille form a rear section of the shuttle-shaped streamlined body with two pointed ends. If the main function of the machine is only to generate electricity, then cancel the rear propeller, the outlet grille is the rear support to supports tail ends of the evaporating pipe of the evaporator and supports a rear part of the protective cover, the cone-shaped fairing is also part of the main body shell, namely the tail cone, and the heat source flow cross-section between the main body and the protective cover does not need be contracted to press the overflowing heat source to accelerate outflow to obtain reverse thrust.

In summary, the appearance of the single-source heat engine is similar to that of a turbojet engine without an afterburner, the single-source heat engine is externally provided with a waist-drum-shaped protective cover, the front and rear parts are provided with openings and are provided with grilles, an interior is provided with a streamlined main body with an approximate cylindrical shape in a middle section transitioning to a pointed cone shape at both ends and co-axial with the protective cover with appropriate spacing for the ambient heat source to flow through to heat the evaporating pipes of low-boiling refrigerant arranged longitudinally in an annular row in between, front ends of all the evaporating pipes are bent centripetally and open to a peripheral annular wall of the gas collecting chamber and are fixedly connected to the front supports by ribbed plates. A front end of the refrigerant liquid flow core pipe at an axis of each evaporating pipe penetrates into the liquid collecting chamber at an outlet of the small turbine impacted by the high-pressure liquid flow that drives rotation of the compressor in an inner wall of the annular gas collecting chamber. The liquid flow core pipe goes backward along the axis of the evaporating pipe to a tail end, a terminal is fixedly connected to the check valve, and the tail end of the evaporating pipe is fixedly connected to the rear support. The front and rear supports connect the main body and the protective cover into an integral whole. Inside the main body connected with the front and rear supports is the front and rear compartment bases, which roughly divides the main body into three compartments. In a front compartment there is the main generator, in a middle compartment there is an annular gas collecting chamber and an enclosing annular liquid collecting chamber, a gas compressor and an enclosing small turbine driven by it. The heat exchange chamber and the radiator therein, the turbine and the compressor surrounding it, the inward-rolling backflow chamber where a turbine outlet is folded inward at 180 degrees to the compressor inlet; in the rear compartment is provided with an integrated starter and generator, and the clutch for driving the rear propeller (in case the main function is boat propelling power). A driven spline shaft of the clutch is fixedly connected with the rear propeller, and a driving spline hub is fixedly connected with a tail end of the spindle. The spindle is forwards fixedly connected with the rotor of the integrated starter and generator, the planetary carrier is fixedly connected with a gear ring of a planetary gear on the rear compartment base, penetrates through a sleeve shaft with one end fixedly connected with the sun gear and an other end ending with a straight-grained tapered cylinder throat and neck part and then is fixedly connected with a slender throat and neck part of a straight-grained tapered cylinder which is used as a main turbine conical cylinder type power output shaft and a compressor shell, then penetrates through the front compartment base, is restrained by a bearing therein and then is fixedly connected with a main generator rotor of the front compartment, and penetrates through a front sealing chamber and finally is fixedly connected with the front propeller. An outer wall of the straight-grained tapered cylinder shaft is fixedly connected with a multi-stage turbine impeller which is alternately arranged with a static (guide) impeller fixedly connected on an inner wall of the main body shell. The multi-stage impeller fixedly connected to the compressor on an inner wall of the tapered cylinder shaft are alternately arranged with the multi-stage impeller which are oppositely rotated and fixedly connected to the outer wall of the spindle outer sleeve shaft. An inlet end of each liquid flow radiating pipe of the radiator in the heat exchange chamber in front of an inlet of the turbine is centripetally connected with a shaft throat part of the straight-grained tapered cylinder and communicated with the outlet annular groove of the compressor, the outlet end is communicated with the inlet of the small turbine in the hub for driving the compressor, the small turbine is positioned outside a slender neck part of the straight-grained tapered cylinder fixedly connected with a spindle, the guide impeller is fixedly connected with an outer wall of the slender neck part, and the movable impellers which are alternately arranged are fixedly connected with inner wall of a compressor hub. A rear end of the compressor hub is constrained by a one-way bearing and a high-pressure dynamic sealing ring on a radiator base outside the tapered cylinder neck, and the front section of the compressor hub is constrained by a bearing and a high-pressure dynamic sealing ring on an outer wall of the liquid collecting chamber in the front compartment base. The small turbine has an inlet for receiving the high-pressure jet flow of each radiating pipe of the radiator at rear and an outlet for collecting the high-pressure jet flow into the liquid collecting chamber at front. The liquid collection chamber, in addition to the liquid flow core pipes radially connected to an axis of all evaporating pipes on the surrounding outer wall, is also connected to a liquid storage tank outside the protective cover through pipes in the front compartment base and the front supports.

Thus, when the machine is turned on, the required power is connected to the starter motor, and at the same time, an appropriate amount of liquid refrigerant is injected into the liquid collecting chamber from the liquid storage tank. Liquid refrigerant enters the liquid flow core pipe at an axis of each evaporating pipe to the end check valve under the driving of the compressor, is released, absorbs heat of the environmental heat source transmitted by the evaporating pipe wall, is evaporated, expanded and flushed to the gas collecting chamber, is further pressurized and flushed into the heat exchange chamber through the gas compressor, absorbs heat of the radiating pipe, then impacts rotor blades of the main turbine to do work, which impacts and absorbs condensation heat from the compressor at the center, which is introduced by rotor blades and a straight-grained tapered cone-shaped rotating shaft; the liquid refrigerant enters the inner-rolling backflow chamber to be quickly sucked by the compressor, the liquid refrigerant is compressed and flows to the radiator pipe of the heat exchange chamber through the straight-grained tapered cone-shaped rotating shaft and an impeller fixedly connected with the straight-grained tapered cone-shaped rotating shaft, the high-pressure refrigerant is liquefied by heat dissipation and impacts the small turbine in the compressor hub for driving the gas compressor to rotate at a high speed, an outlet of which is the liquid collecting chamber, and so on and so forth; the power supply for starting a motor can be cut off after the stable work, the power is output outwards continuously through the spindle to drive the propeller and/or the generator, and the machine can operate continuously without considering that mechanical abrasion need maintenance regularly.

If the engine needs to be stopped, disconnecting the generator output line, while quickly extracting appropriate amount of the liquid refrigerant in the liquid collecting chamber to the liquid storage tank, due to the amount of refrigerant in the engine is too small to maintain the cycle, the engine will automatically shut down.

The generator set of this invention can also be placed high above the city to eliminate the heat island effect, but also to create a local cool atmosphere for large celebration. The invention can even be used as a tool for artificial weather intervention, generating electricity and causing precipitation in areas that have been dry for years with little rain. The invention may also be used as a fresh water production tool, also generates electricity while producing sea ice. The generator of the present invention can also be installed in the train to provide power for it, without the need to pull the power grid along the way.

The invention claimed is:

1. A heat pump engine, wherein a multi-stage impeller type compressor is coaxially arranged with and positioned within an outer radial extent of a multi-stage impeller type turbine, a straight-grained tapered cylindrical shell of the compressor is also a turbine rotor and a power output cylinder shaft; an outlet of the turbine is folded back to a center, which is an inlet of the compressor, conducive to the recovery of released heat by compression, and also conducive to the overall compact structure and rational layout; the heat pump engine comprising:

a spindle connected with an interior of a slender neck of the straight-grained tapered cylinder and an external spline, the spindle being connected with a spindle front bearing in a threaded manner; a second high-pressure dynamic sealing ring arranged behind the spindle front bearing to seal high-pressure liquid flow of a liquid collecting ring chamber;

a nose cone fairing, which together with an inlet grille and an outer ring forms a fixed whole to cover front ends of two semi-circular cylindrical protection covers and is fixed with screws, the protection covers being fixed via edgings with screws;

a front propeller and a rear propeller, each propeller including propeller blades and a propeller hub forming an integral whole, connected with head and tail screws of the spindle;

front generators and a gas collecting chamber separated by a front compartment base;

front supports fixedly connected between the protective cover and a main body, the front supports being fused with an outer side of a front end of a front section of a main body shell, and an axial visual angle of the supports being radially arranged and consistent with the directions and the quantity of the evaporating pipes radially extending from an outer wall of the gas collecting chamber; a periphery of each support being fused with a wheel rim attachable to a corresponding part of the protective cover and fixedly connected to an inner side of the protective cover by screws; front and rear edges of each support being in a cutting-edge shape, with a middle part being thick, and the rear edge being fixed with a rib arranged in front of the evaporating pipes by screws and nuts;

each evaporating pipe being longitudinally and radially arranged, tail ends of the evaporating pipes being respectively loose before assembly, and front ends of the evaporating pipes being centripetally bent and integrated with an approximately circular truncated cone-shaped annular cylinder tightly attached to an outer wall of a front section of the main body shell, the evaporating pipes being fixedly connected to the outer wall of the front section of the main body shell with screws; a tail end of each evaporating pipe being fastened by a nut on a tailstock through external threads; the main body shell surrounded by the evaporating pipes being divided into two sections; an inner side of a front end of a front section being fixedly connected to a front compartment base with screws; a rear end of the front section and a front end of a rear section being fixedly connected to an exterior of a hollow shell of a gas compressor stator with screws; and an inner side of a rear end of the rear section being fixedly connected to a rear compartment base with screws;

liquid flow core pipes, each liquid flow core pipes of the evaporating pipes extending from a front end of each evaporating pipe, penetrating through the gas collecting chamber, and being screwed into a corresponding liquid flow hole on an inner wall of the gas collecting chamber by a through screw; the liquid flow holes being communicated with a liquid collecting ring chamber at an outlet of a small turbine, and each liquid flow core pipe being fixedly connected with an appropriate number of radial tripod supports so that each liquid flow core pipe is always centered within the corresponding evaporating pipe; a tail end of each liquid flow core pipe being positioned in a rear support and fastened to a check valve by a through screw against a flange at a pipe end;

rear supports having front and rear edges in a cutting-edge shape, with a middle part being thick, openings being provided on middle and rear parts of all rear supports on the same side, and covers being provided on the openings and fixedly connected by through screws; each hollow rear support being provided with a row of tailstocks and check valves corresponding to each evaporating pipe to facilitate assembly and maintenance;

a heat exchange chamber radiator having a base fixedly connected to an outside of a neck of the straight-grained tapered cylinder in a spline manner, the base being pressed by a small turbine stator, which is also fixedly connected to an outside of a slender neck of the straight-grained tapered cylinder in a spline manner;

inlet and outlet ends of a heat exchange chamber on the base each being provided with a bracket for supporting and fixedly connecting the radiator and being integrated with the base;

the radiator being screwed into a hole in the base that is communicated with a compressor outlet by a through screw against a flange of a pipe end at an outlet end of the heat exchange chamber; and the radiator being screwed into a hole in the base that is communicated with an inlet of the small turbine in the same way at an inlet end of the heat exchange chamber;

a gas compressor rotor having a rear end of a hub constrained on a radiator base by a high-pressure dynamic sealing ring with a sliding bearing, and a front end constrained within an inner wall of the gas collecting chamber by a third high-pressure dynamic sealing ring with a sliding bearing;

an exhaust nozzle exit with a jet flow drainage groove, an outlet grille, and a stern cone fairing are integrated, a front end covering rear ends of two semi-cylindrical protection covers and fastened with screws;

a compressor inner rotor, having a front end of a cylinder shaft slidably connected with an inner side of a throat part of the straight-grained tapered cylinder by a first high-pressure dynamic sealing ring; a rear end being connected to the spindle through a tapered roller bearing, an outer side of the rear end being fixedly connected with a sun gear of a planetary gear, and an inside of the rear end supporting a large-opening-end bearing of the straight-grained tapered cylinder;

a gear ring of the planetary gear fixedly connected to a rear section of the spindle in a spline manner through a wheel disc hub; a front end of a rear integrated starter and generator being fixedly connected to the gear ring through internal threads; a shaft-end bearing of spindle outer sleeve being sleeved on the spindle and pressed against the spindle in front of the gear ring of the planetary gear;

a centripetal inner-rolling backflow chamber being partitioned, wherein after the front compartment base is fixedly connected to a front end of a front section of the main body shell, a spindle front bearing is installed, a front generator is installed, and then a front end cover is installed and fixedly connected to the front compartment base with screws; a propeller shaft sealing ring being arranged on the front end cover, and a sealing ring cover being fixedly connected to the front end cover with screws; the front propeller being fastened to a front end of the spindle by a washer nut;

after the rear compartment base is fixedly connected to a rear end of a rear section of the main body shell, planetary gears are installed, the planetary gear being fixedly connected to the rear compartment base with screws, a gear ring hub being fixedly connected to the spindle in a spline manner, a rear integrated starter and generator being installed, a base of the integrated starter and generator being fixedly connected to the rear compartment base with screws, and a base of a stator serving as a spindle rear bearing, an inner ring of the bearing being restrained on the spindle by a backstop backing ring; the backstop backing ring being fixedly connected to the spindle by threads and restraining both the bearing and the gear ring hub; a rear end cover with a propeller shaft sealing ring being fixedly connected to the rear compartment base with screws, and a sealing ring cover being fixedly connected to the rear end cover with screws; the rear propeller being fastened at a rear end of the spindle by a washer nut;

sealing rings being provided between a shaft end of the spindle outer sleeve and the rear compartment base to seal and isolate the centripetal inner-rolling backflow chamber, the planetary gear chamber, and the integrated starter and generator chambers;

the rear support and a periphery of the rear compartment base being fused together and radially and uniformly distributed, consistent with the longitudinally and radially arranged evaporating pipes; the periphery also being fused with a wheel rim that is attachable to a corresponding part of the protective cover and fixedly connected to an inner side of the protective cover with screws;

blades of all impellers being integrally formed with the hub or the wheel rim, and an interior of the hub or an exterior of the wheel rim being fixedly connected to corresponding parts in a spline manner.

2. The heat pump engine of claim 1, wherein a multi-stage impeller type gas compressor is provided between the gas collecting chamber for collecting gases from all evaporating pipes and the turbine; a heat exchange chamber is provided between the gas compressor and the turbine, and a high-pressure and high-temperature refrigerant is condensed back to the liquid state after latent heat is released by the radiator heat exchange chamber; the spindle inside the straight-grained tapered cylinder is provided with a counter-rotating sleeve shaft having multi-stage impellers fixedly connected to an outside of the sleeve shaft and multi-stage impellers fixedly connected to an inside of the cone-shaped outer shell in alternating configurations and counter-rotating, so that compression efficiency is greatly improved; a small turbine impacted by high-pressure liquid flow at an outlet of the radiator is arranged between the gas compressor hub and the slender neck of the straight-grained tapered cylinder, guide blades are fixedly connected outside the slender neck, a rotor is fixedly connected in the gas compressor hub, and the small turbine not only recovers part of the pressure energy of the high-pressure refrigerant pressed back to the liquid state, but also enables the gas compressor to operate faster and more efficiently based on the rotating speed of the turbine;

the heat pump engine further comprising a plurality of temperature, pressure and rotating speed sensors, and a self-destruction electronic control system for preventing private disassembly and displacement, wherein a self-destruction charge is arranged in the front compartment base, a hollow shell of the compressor stator, and the rear compartment base.

* * * * *